United States Patent [19]

Tachi

[11] 4,167,759
[45] Sep. 11, 1979

[54] APPARATUS FOR INSERTING AN ADDRESS SIGNAL IN A FRAME OF THE VERTICAL BLANKING PERIOD OF A TELEVISION SIGNAL

[75] Inventor: Katsuichi Tachi, Kawasaki, Japan

[73] Assignee: Sony Corporation, Tokyo, Japan

[21] Appl. No.: 819,173

[22] Filed: Jul. 26, 1977

[30] Foreign Application Priority Data

Jul. 31, 1976 [JP] Japan .................................. 51-91552

[51] Int. Cl.² ...................... G11B 27/14; G11B 27/30; G11B 27/32; H04N 5/22
[52] U.S. Cl. ..................................... 360/14; 358/147; 360/72.2
[58] Field of Search ............................. 360/14, 72, 33; 358/147, 127

[56] References Cited

U.S. PATENT DOCUMENTS

| 3,493,674 | 3/1970 | Houghton | 358/147 |
| 3,576,391 | 4/1971 | Houghton | 358/147 |
| 3,761,611 | 9/1973 | Nakamura et al. | 360/35 |
| 3,890,638 | 6/1975 | Bargen | 358/8 |
| 3,931,457 | 1/1976 | Mes | 360/72 |

FOREIGN PATENT DOCUMENTS 42-4540 2/1967 Japan .
51-46402 12/1976 Japan .

OTHER PUBLICATIONS

"American National Standard Time and Control Code for Video and Audio Tape", Jul. 1975, Journal of the SMPTE, vol. 84, paragraph 6.3.
Darrington, "Wireless World Teletext Decoder 1-The Background", Wireless World, vol. 81, No. 1479, pp. 498-504, 11/75.

Primary Examiner—Bernard Konick
Assistant Examiner—Donald McElheny, Jr.
Attorney, Agent, or Firm—Hill, Van Santen, Steadman, Chiara & Simpson

[57] ABSTRACT

An editing system having a circuit for inserting an address signal in a vertical blanking period of a video signal, a generator for the SMPTE time code, a reader for reading the address signal in a vertical blanking period of a video signal, a reader for reading the SMPTE time code, and a preset circuit for presetting the SMPTE time code generator according to an output of the SMPTE time code reader.

3 Claims, 11 Drawing Figures

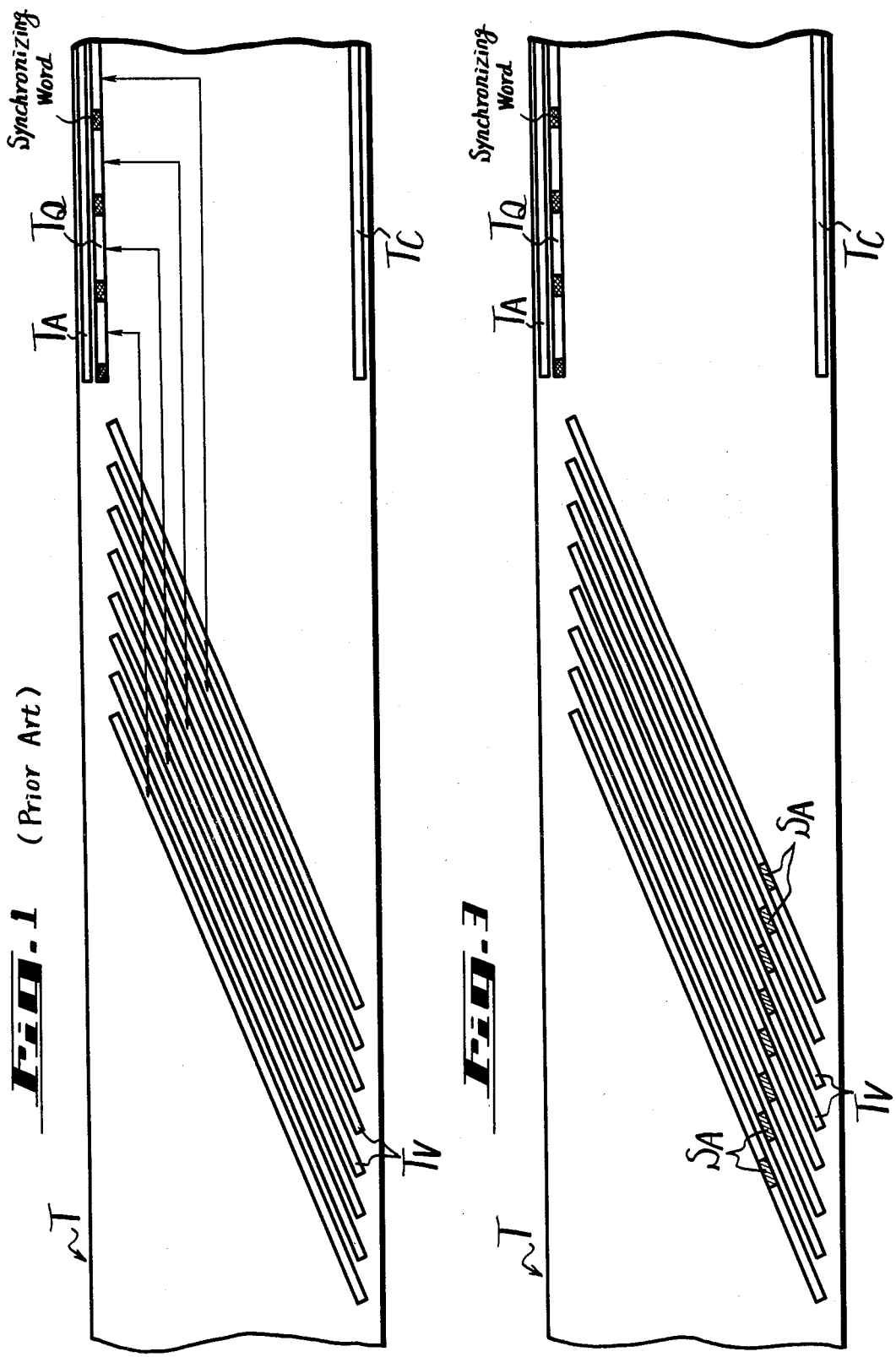

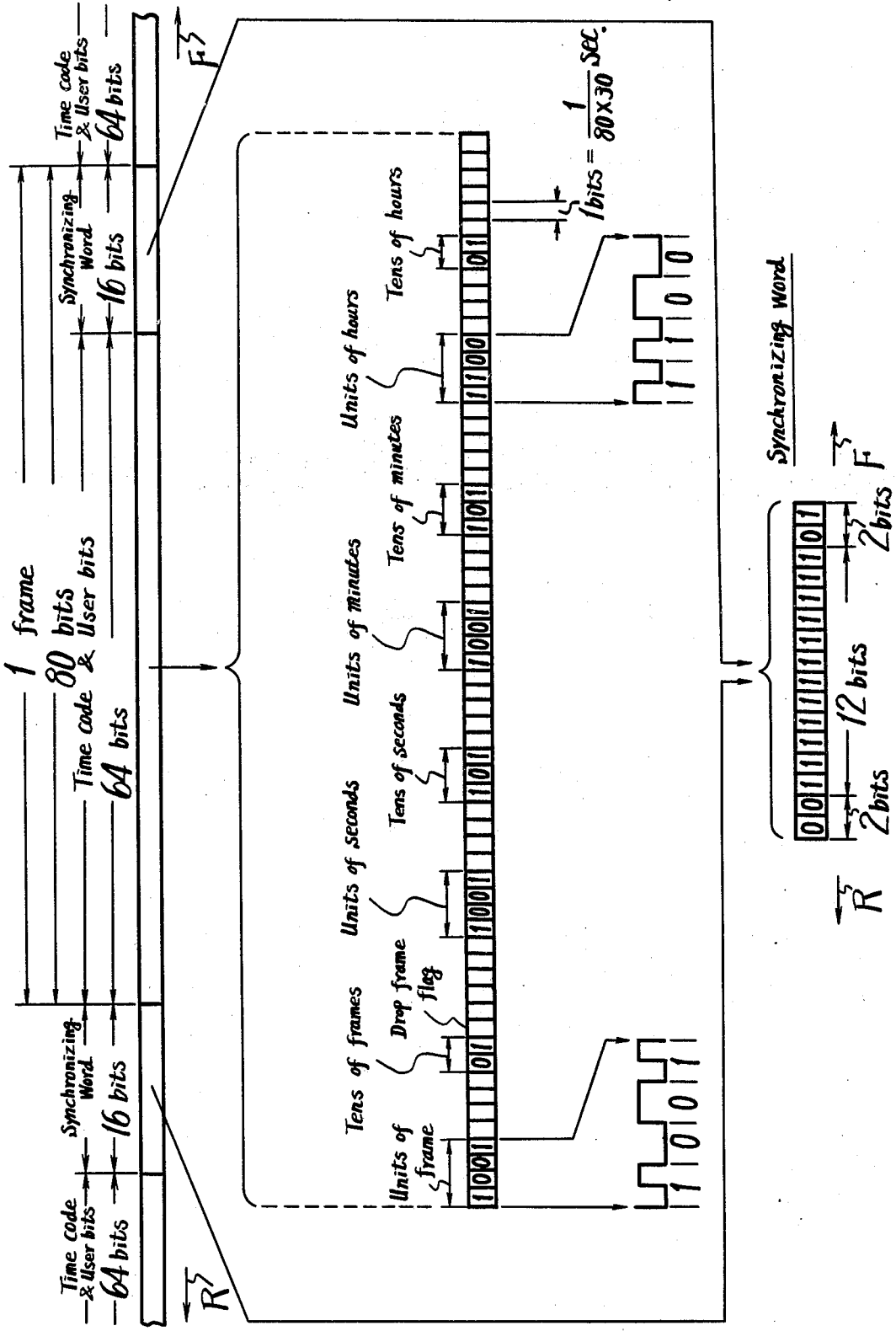

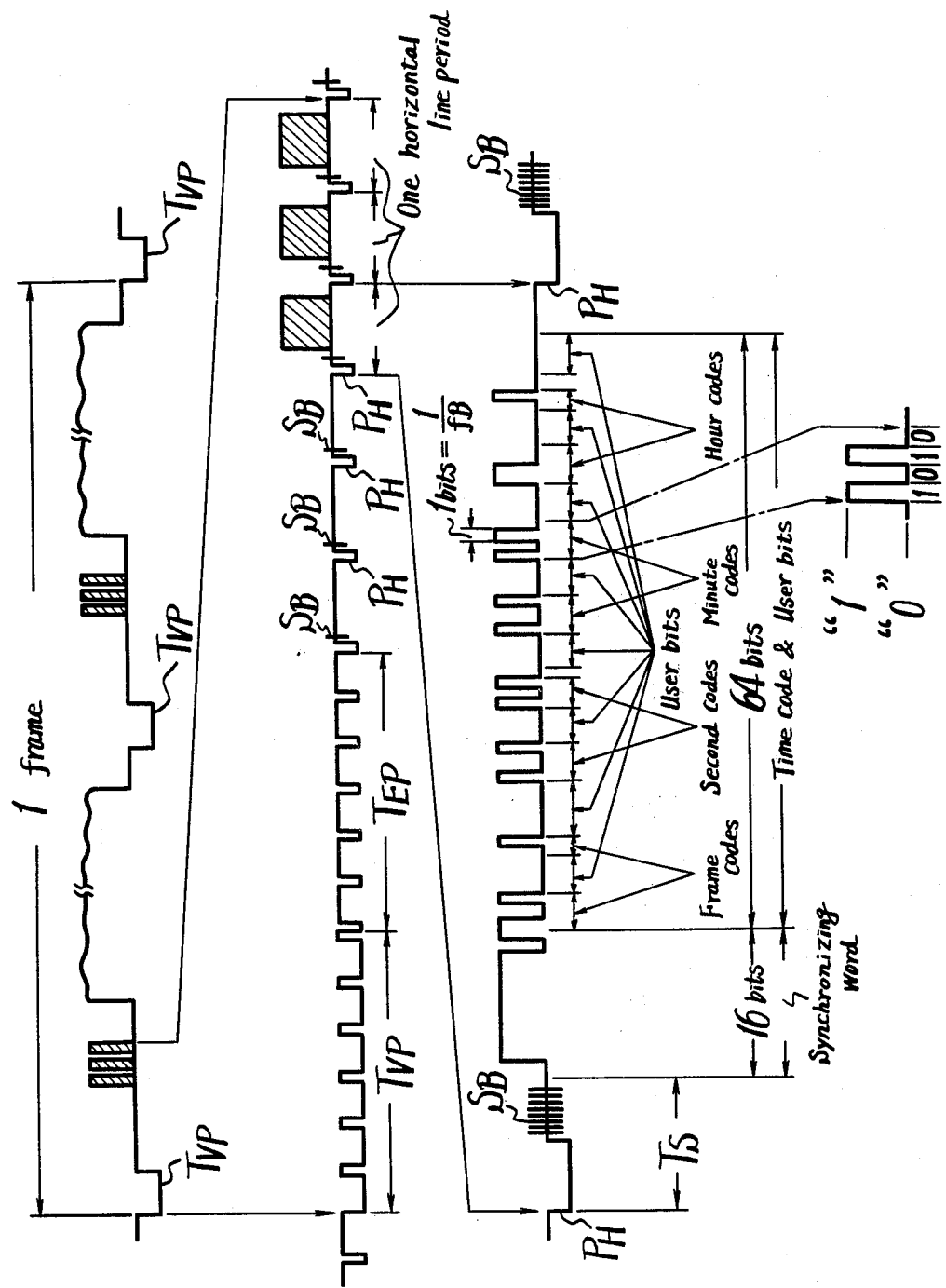

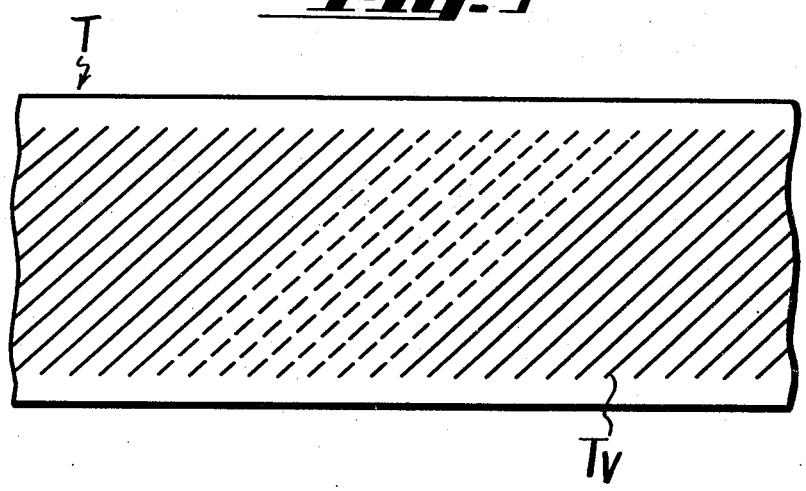
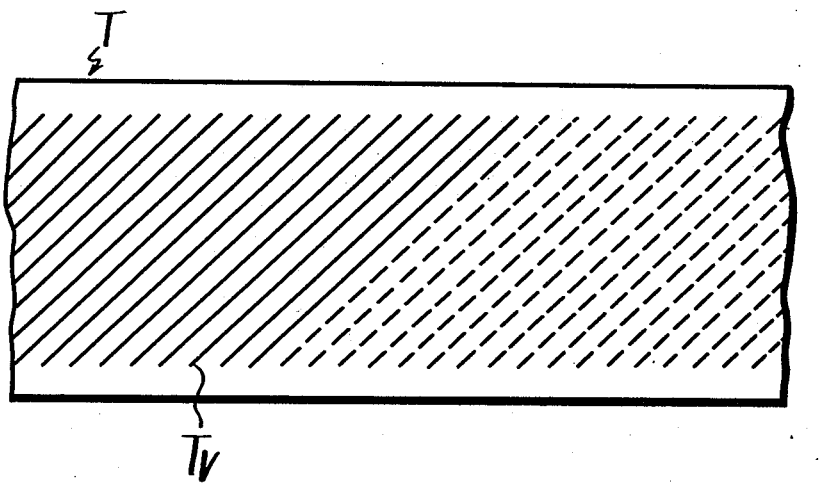

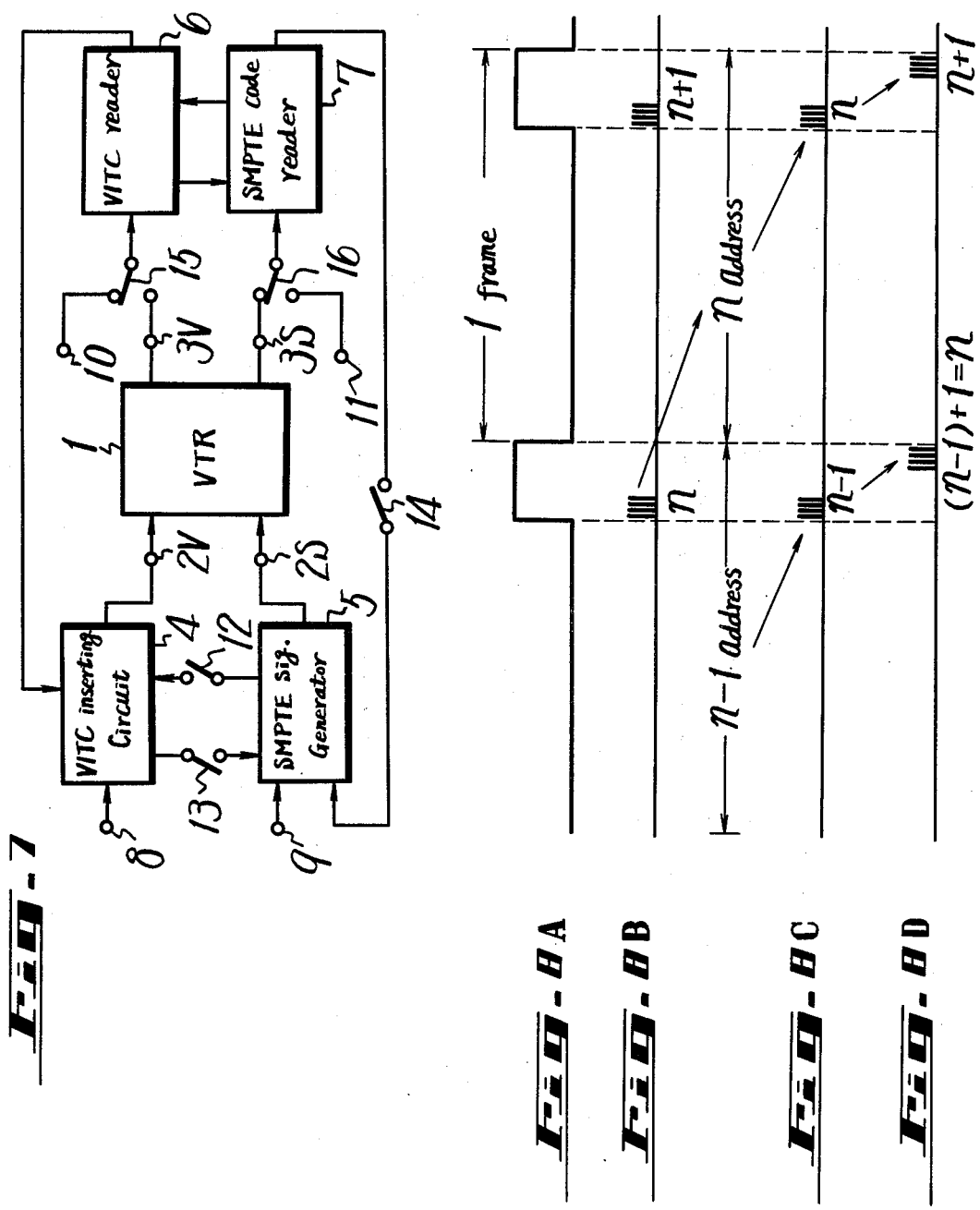

APPARATUS FOR INSERTING AN ADDRESS SIGNAL IN A FRAME OF THE VERTICAL BLANKING PERIOD OF A TELEVISION SIGNAL

BACKGROUND OF THE INVENTION

1. Field of the Invention

This invention relates generally to an editing system, and is directed more particularly to a system which provides an address signal used for recording a video signal into the vertical blanking period of which the address signal is inserted.

2. Description of the Prior Art

In order to achieve an edition of a video and/or audio signal speedily and precisely, in the art there is proposed a method of recording an address-signal on a magnetic tape in addition to a video and/or audio signal. In this case, as the address signal there are present signals of various codes, but the SMPTE time code signal is recommended as an American National Standard and the EBU time code signal is recommended as a standard code for 625 - line/50 - field television tape-recordings. In the art, the above two time code signals are coded on a record medium along its longitudinal tracks and the readout of the signals can be achieved at tape speeds from slow to high speed. In the case where the record medium is stopped or transported at a very low speed, the reproduction of time code signals becomes impossible. In fact, upon editing a video tape by a video tape recorder its merit is that an editor can choose individual frames presented visually at very low tape speeds, but there occurs such a demerit in this case that the address of a choosen frame can not be known.

The time code signals identify each television frame, but the identification of its even or odd field and that of the phase of the burst signal of each television field are impossible. Therefore, no precise editing can be achieved by the above prior art.

In order to remove the above defects, the inventor of this invention has proposed such a method to insert an address signal, which will be referred to as a VITC (vertical interval time code) signal, in a vertical blanking period of a video signal in the copending application U.S. Ser. No. 819,172, filed on July 26, 1977 U.S. Pat. No. 4,134,130. If both the VITC signal and longitudinal track time code signal such as the well-known SMPTE time code recorded on a longitudinal track of a magnetic tape are used, the address of a video signal can be always known regardless of transportation speeds of the tape.

However, it is necessary that when insert editing or assemble editing is carried out, the VITC and longitudinal track time code of video signals which are newly recorded should be made such codes continuous to those of video signals which were recorded previously.

OBJECTS AND SUMMARY OF THE INVENTION

An object of this invention is to provide en editing system which is useful for editing a magnetic tape on which video signals inserted with the VITC signal are recorded and for recording new video signals.

Another object of the invention is to provide an editing system which can be used not only in editing but also recording a signal including an address signal.

To this end, according to an editing system of the present invention, there is provided a VITC signal inserting circuit which is controlled upon editing in accordance with the VITC signal and/or longitudinal track time code signal obtained from a VTR (video tape recorder) or slave VTR by which a new recording is carried out so as to make the VITC of a newly recorded signal continuous to the time code of a previously recorded signal.

The other objects, features and advantages of the invention will become apparent from the following description taken in conjunction with the accompanying drawings.

BRIEF DESCRIPTION OF THE DRAWINGS

FIG. 1 is a top plan view of a part of a magnetic tape on which a video signal is recorded as slant tracks and an address signal is also recorded by a prior art method;

FIG. 2 is a schematic diagram illustrating the SMPTE time code signal recorded on the tape;

FIG. 3 is a top plan view of a part of a magnetic tape on which a video signal and address signal are recorded by the method of the invention;

FIG. 4 is a diagram showing a recorded pattern of signals on a tape which is recorded by the invention;

FIG. 5 is a diagram showing a part of a magnetic tape used for the explanation of tape edition;

FIG. 6 is a diagram showing a part of a magnetic tape used for the explanation of tape edition;

FIG. 7 is a block diagram showing an example of editing systems according to the invention; and FIGS. 8A to 8D are waveform diagrams used for explaining the operation of the system shown in FIG. 7.

DESCRIPTION OF THE PREFERRED EMBODIMENTS

Before describing the present invention, a prior art method of recording an address signal on a magnetic tape will be now described with reference to FIG. 1 which shows a part of a magnetic tape on which an address signal is recorded in addition to a video signal.

In FIG. 1, $T_V$ represents slant video tracks formed on a magnetic tape T each of which includes a video signal of one field, and $T_A$, $T_Q$ and $T_C$ designate tracks on tape T which include an audio, cue and control signals, respectively. On cue track $T_Q$ there is recorded an address signal. In this case, an SMPTE time code signal is used as the address signal and two video tracks $T_V$ which form one frame are identified by one SMPTE time code signal.

The SMPTE time code is approved as the American National Standard time and control code for video and audio tape for 525 line/60 field television systems on Apr. 2, 1975 and published on the Journal of the SMPTE, Volume 84, July 1975.

As shown in FIG. 2 which schematically illustrates the SMPTE code signal, each address corresponding to one frame consists of 80 bits numbered 0 through 79 and the bit frequency is selected as 2.4 $KH_z$. In the case of FIG. 2, time address bits consisting of 26 bits show 29 frames, 59 seconds, 59 minutes, and 23 hours. The bit number 10 is the drop frame flag, the bit numbers 11, 27, 43, 58 and 59 are unassigned address bits, and the bit numbers 4 to 7, 12 to 15, 20 to 23, 28 to 31, 36 to 39, 44 to 47, 52 to 55 and 60 to 63 are user bits, respectively. The synchronizing word of 16 bits is so arranged that it is discriminated whether the tape is transported in the forward direction and hence the SMPTE time code signal is read out in the direction indicated by an arrow F or the tape is transported in the backward direction and hence the SMPTE time code signal is read out in the direction indicated by an arrow R. Accordingly, the time code signal can be read out correctly even if the tape is transported in any direction. In this case, the code signal is so recorded that the information "1" and "0" thereof are recorded as a so-called bi-phase mark, as shown in FIG. 2.

As described above, if the address signal for each frame of the video signal is recorded on the track $T_Q$ which extend in the lengthwise direction of tape T, the tape edition can be carried out very rapidly and precisely.

However, in the case of a slow or still motion reproduction mode, the speed of the tape becomes very slow or the tape is stopped so that the code signal recorded on the track $T_Q$ can not be read out.

Hereinafter, with reference to FIGS. 3 and 4 an example of the invention proposed in the aforesaid by copending US application will be described by which an address signal can be read out even in a slow or still reproduction mode and hence the edition of a tape can be carried out efficiently and in which the video signal of the NTSC system is shown as an example.

In FIG. 3 which is a top plan view of a part of a magnetic tape T on which the video signal and address signals are recorded by the method of the invention.

With the invention, and address signal $S_A$ identifying a video signal corresponding to each track $T_V$ is inserted in the video signal as a digital signal and the video signals, each including the address signal $S_A$, are recorded on the tape T as slant tracks $T_V$. The address signals $S_A$ recorded on the video tracks $T_V$ are marked with single hatches in FIG. 3. In this case, the address signals $S_A$ are inserted into the video signals of odd and even fields of one frame and then recorded as shown in FIG. 3.

As shown with single hatches in FIG. 4 which shows a record pattern of signals on the tape (not shown) by the invention, one address signal is inserted into one horizontal line period in the suppressed line period within the vertical blanking period or vertical interval except a vertical synchronizing pulse period $T_{VP}$ and equalizing pulse period $T_{EP}$. In this case, the address signal is inserted in the period after burst signals $S_B$ and it is desired that the same address signals are inserted repeatedly into three successive horizontal line periods. Hereinafter, this address signal will be referred to simply as a VITC (vertical interval time code) signal. The above suppressed periods mean 10th to 21st line periods in the NTSC system.

The code of the VITC signal consists of, for example, 80 bits similar to the SMPTE time code signal shown in FIG. 2 and its bit frequency $f_B$ is selected as the color subcarrier frequency $f_{SC}$ (=3,58 MH$_z$) divided by an integer, for example, one half ($\frac{1}{2}$) of frequency $f_{SC}$. If the horizontal line frequency is taken as $f_H$ and the vertical frequency as $f_V$, respectively, the following relation (1) is established:

$$f_{SC} = \frac{455}{2} f_H = \frac{455 \times 525}{4} f_V \quad (1)$$

Thus, if the following relation (2) is established:

$$f_B = \frac{1}{2} f_{SC} \quad (2)$$

the following equation (3) is presented:

$$f_B = \frac{455}{4} f_H \quad (3)$$

Thus, 80 bits of the VITC signal can be inserted into one horizontal line period.

In 80 bits, 32 bits are address bits, other 32 bits are user bits and remaining 16 bits are sync (synchronizing) words, respectively. The arranging relation between the address bits and user bits could be same as that of the SMPTE time code signal shown in FIG. 2, and the address bits inserted in odd and even fields of the same frame are selected same in code. The sync words are located at the head of the VITC signal or immediately after the burst signal $S_B$. As set forth above, the sync words having the same code as that of the SMPTE time code signal shown in FIG. 2 could be sufficient, but they are recorded on the video track and hence the reading direction of the code signal is constant irrespective of the tape transporting direction. Therefore, they could have entirely different type of the code. By way of example, they could be changed to the start codes of the VITC signal and the field identification code to identify the odd field and the even field. Further, the field identification can be achieved by making the bit number 11 to be "0" or "1".

Through the SMPTE time code signal and VITC signal are recorded on different tracks, their contents or addresses must correspond with each other. In the art there has been known an edit mode such that, as shown in FIG. 5 which shows a part of a magnetic tape T having recorded thereon video signals as slant tracks $T_V$, parts of recorded tracks $T_V$ shown by dotted lines in FIG. 5 are erased and then other video signals are recorded on the erased part of tape T, namely, an insert editing is carried out, or such a case that, as shown in FIG. 6 which shows a part of a magnetic tape T on which video signals are already recorded as slant tracks $T_V$, there are newly recorded other video signals following the previously recorded tracks as shown by dotted lines in FIG. 6, namely, an assembly editing is carried out. In FIGS. 5 and 6, tracks $T_A$, $T_Q$ and $T_C$ are omitted for the sake of brevity. In such a case that video signals, which are inserted and then recorded on a tape or recorded additionally on the tape, are inserted with the VITC signal $S_A$, if the video signals are recorded on the tape as they are, the VITC signals or addresses in recorded tracks $T_V$ of video signals have no continuity and hence do not correspond to the SMPTE time code signals and/or VITC signal of the video signals recorded already. Accordingly, in such a case it is necessary that the VITC signal $S_A$ in the video signal, which is to be inserted or added and then recorded, is removed and thereafter a signal, which has the continuity to the VITC signal $S_A$ of the track $T_V$ recorded already and corresponds to the SMPTE time code recorded on track $T_Q$, is inserted and then recorded.

The present invention is to provide an editing system which can carry out an editing including the address signal.

An example of editing systems according to the invention will be now described with reference to FIG. 7.

In FIG. 7, 1 designates a VTR (video tape recorder). This VTR 1 records a video signal supplied thereto through an input terminal 2V on a tape (not shown) as a slant track $T_V$ and records the SMPTE time code signal applied thereto through an input terminal 2S on the tape as the track $T_Q$ extending in the longitudinal direction of the tape in recording mode, while reproduces the video signal from the track $T_V$, then delivers the same to an output terminal 3V and reproduces the SMPTE time code signal from track $T_Q$, then delivers the same to an output terminal 3S in reproducing mode.

In FIG. 7, 4 designates a VITC signal inserting circuit which produces the above VITC signal $S_A$ and then inserts the same into the video signal, and 5 an SMPTE time code signal generator. The VITC signal inserting circuit 4 can use various circuits shown in, for example, my above-mentioned copending US application.

The editing system shown in FIG. 7 has further provided with a VITC reader 6 for reading the VITC signal $S_A$ from the video signal, into which the VITC signal $S_A$ is inserted, and an SMPTE code reader 7 for reading the SMPTE time code signal.

A video signal which is to be newly inserted and then recorded, is applied to VITC signal inserting circuit 4 through an input terminal 8, and its synchronizing signal is applied to SMPTE time code generator 5 through an input terminal 9, respectively. The synchronizing signal applied to input terminal 9 is fed to SMPTE time code signal generator 5, which then produces a frame pulse from the synchronizing signal and SMPTE time code signal. However, if the SMPTE time code signal is recorded in the track $T_Q$ on the tape of VTR 1, this SMPTE time code signal is reproduced, then supplied through a switch 16 to SMPTE code reader 7 and read out thereby. The output signal from SMPTE code reader 7 is fed through a switch 14 to SMPTE time code signal generator 5 as a preset signal so as to make the SMPTE time code signal therefrom correspond to the SMPTE time code signal recorded on the tape. The SMPTE time code signal thus obtained from SMPTE time code signal generator 5 is fed through a switch 12 to VITC signal inserting circuit 4. When there is the VITC signal in a video signal to be newly inserted and recorded, this VITC signal is removed, and in place thereof such a VITC signal $S_A$ which is provided by time changing the SMPTE time code signal SMPTE time code generator 5 is inserted into the video signal. The video signal into which the new VITC signal $S_A$ is inserted is supplied from VITC signal inserting circuit 4 through input terminal 2V to VTR 1 which inserts or additionally records the video signal on the tape such as shown in FIG. 5 or 6.

In the example of the invention shown in FIG. 7, SMPTE time code signal generator 5 produces a synchronizing word pulse in the interval of a synchronizing word after a frame as shown in FIG. 8A and forms a time code at the initial position of the synchronizing word pulse as shown in FIG. 8A. Since it requires the time of one frame to read out the SMPTE time code, SMPTE code reader 7 carries out its reading delayed by one frame as shown in FIG. 8C. Accordingly, SMPTE time code signal generator 5 is preset so as to add one address to the read out output.

By such signal processing, the VITC signals $S_A$ become continuous through tracks $T_V$ which are already formed on the tape and tracks $T_V$ which are newly formed on the tape.

The video signal delivered to output terminal 3V from VTR 1 is fed through a switch 15 to VITC reader 6 which then reads out the VITC signal in the video signal which is already recorded, and a signal which is provided by adding one address to the read out VITC signal is fed to VITC signal inserting circuit 4 as its preset signal. Thus, it becomes possible that the VITC signal in the video signal which will be newly recorded has continuity to the VITC signal in the video signal which is already recorded. This latter method is preferred for use with such a VTR which can not record the SMPTE time code signal.

In FIG. 7, 10 designates an input terminal for an external VITC signal and 11 designates an input terminal for an external SMPTE time code signal. It is possible that the external VITC signal or SMPTE time code signal fed to input terminal 10 or 11 is fed through switch 15 or 16 to VITC reader 6 or SMPTE time code reader 7 to produce the preset signal for VITC signal inserting circuit 4 or SMPTE signal generator 5. Thus, the function of VTR can be improved even though this has no direct relation to editing.

In the system of the invention shown in FIG. 7, the signal transmission between VITC reader 6 and SMPTE time code reader 7 can be carried out to preset, each other. Therefore, it is possible that even when only one of tracks $T_Q$ and $T_V$ includes the code signal (SMPTE time code signal or VITC signal), both readers 6 and 7 can produce the preset signals. In this case, it may be possible that a circuit is provided for comparing the output signals from both readers 6 and 7 to detect whether there is an error read out of the address signal caused by dropouts or not and to change the output from an error reader to that from a correct reader.

When a switch 13 is made ON, the signal from VITC signal inserting circuit 4 is supplied to SMPTE time code signal generator 5. Thus, it is possible that the SMPTE time code signal is produced from the VITC signal which is to be inserted into the video track and recorded on track $T_Q$.

As described above, since with the present invention the VITC signal in the video signal to be recorded is removed and the VITC signal in the video signal which is already recorded or VITC signal preset by the VITC signal from the track extended in the longitudinal direction of the tape is inserted into the video signal which is newly recorded, upon editing the addresses in the video tracks can be made continuous.

Further, with the editing system of the invention, when the signal is transmitted to a remote place, it is not required to transmit the SMPTE time code signal through a line separate from that of the video signal and both the code signals can be recorded in the record tracks.

In the system of the invention shown in FIG. 7, when the video signal from a VTR, in which no SMPTE time code signal is recorded but only the VITC signal is recorded, is dubbed on VTR 1, it is better that the VITC signal from VITC signal inserting circuit 4 is supplied through switch 13 to SMPTE time code generator 5 to preset the SMPTE time code thereof to that corresponding to the VITC. Thus, the SMPTE time code can be also recorded on VTR 1.

The above description is given on a single preferred embodiment of the present invention, but it will be apparent that many modifications and variations could be effected by one skilled in the art without departing from the spirits or scope of the novel concepts of the invention. Therefore, the scope of the invention should be determined by the appended claims only.

I claim as my invention:

1. An editing system comprising:

(a) means for inserting a first address signal in the frames of a vertical blanking period of a video signal recorded on a video track of a tape;
(b) means for generating a second address signal recorded on a longitudinal track of said tape;
(c) a first reading circuit for reading said first address signal reproduced from said video track;
(d) a second reading circuit for reading said second address signal reproduced from said longitudinal track;
(e) means for selecting one address from either of said first address signal inserting means or said second address signal generating means in response to one of the outputs from said first and second reading circuits,
(f) further comprising first means for supplying an output from said first reading circuit to said first address signal inserting means, further comprising second means for supplying an output from said second reading circuit to said second address signal generating means, wherein said first and second supply means for selecting include first and second switches, and further comprising means for controlling said second address signal generating means by said first address signal inserting means.

2. An editing system according to claim 1 further comprising means for controlling said first address signal inserting means by said second address signal generating means.

3. An editing system according to claim 1 further comprising means for controlling said first and second reading circuits with each other.

* * * * *